INVENTOR
L. C. J. ROSCOE
BY E. J. Olinder
ATTORNEY

United States Patent Office 3,430,002

Patented Feb. 25, 1969

3,430,002

COMPATIBLE MULTIFREQUENCY DIRECT CURRENT TELEPHONE SIGNAL RECEIVER

Lawrence C. J. Roscoe, North Brunswick, N.J., assignor to Bell Telephone Laboratories Incorporated, New York, N.Y., a corporation of New York Filed June 15, 1965, Ser. No. 464,177

U.S. Cl. 179—84 10 Claims

Int. Cl. H04m 1/00, 1/50, 3/06

ABSTRACT OF THE DISCLOSURE

In a key telephone system which includes both multifrequency signaling and D-C signaling telephone subsets, an off-hook condition detector circuit is made to serve a dual function in that in response to the performance of the detecting function the circuit is converted into an oscillator that generates a time-out warning signal under the control of an associated timing circuit.

This invention relates to multifrequency signal receivers and, more particularly, to receivers of that type that are designed to operate in a telephone system that includes both multifrequency signaling and D-C signaling subsets.

Multifrequency signaling by telephone subscriber sets, one form of which is known as Touch-Tone® signaling, is now in widespread usage and continued growth is expected. By means of a pushbutton dial a coincident unique dual frequency signal is generated for each number dialed in contrast to the generation of sequential D-C pulses that is effected by the conventional rotary dial. In most areas employing multifrequency calling, telephone central offices are equipped with adapter-type receivers that convert the multifrequency signals into corresponding D-C signals that are utilized to initiate the operation of conventional electromechanical switching systems. A receiver of this type is disclosed by L. A. Meacham and L. Schenker in United States Patent 3,076,059, issued Jan. 29, 1963.

Additional complexities are introduced into the problems of multifrequency signaling in those areas that also include conventional D-C signaling subsets. These problems have largely been solved insofar as central office receivers are concerned. In key telephone systems, however, wherein signal receiver equipment is typically installed on the subscriber's premises, a number of problems remain unresolved. Largely because of cost limitations imposed by the fact that the common equipment serves relatively few lines, such systems must employ substantially less complex circuitry than functionally similar circuitry that would be acceptable in central offices. Prior art attempts to provide the required simplicity have been successful only at the cost of some reduction in reliability.

Accordingly, one object of the invention is to enhance the reliability of multifrequency signal receivers.

Another object is to reduce the complexity of multifrequency signal receivers.

A further object is to simplify multifrequency signal receivers of the type employed in telephone systems that include both multifrequency and D-C signaling subsets.

These and other objects are achieved in an illustrative embodiment of the invention that is specifically adapted for use as a multifrequency receiver in a telephone system that includes both multifrequency and D-C signaling subsets. When functioning as a detector, in accordance with the principles of this invention, a dual-function detector-oscillator circuit is made operatively responsive to the off-hook condition of multifrequency subsets but is insensitive to the same condition on D-C signaling sets. Switching means responsive to the operation of the detector convert the detector circuit to a multivibrator circuit or oscillator that generates a time-out warning signal under the control of a timing circuit. These same switching means also complete circuit paths for the application of power to the channel circuits and logic circuits of the receiver. In the absence of power the receiver is of course insensitive to all input signals.

Accordingly, one feature of the invention relates to a signal receiver, for a telephone system that includes both multifrequency and D-C signaling subsets, that is activated by an off-hook condition on one of the multifrequency subsets but which remains insensitive to an off-hook condition on one of the D-C signaling subsets.

Another feature of the invention involves a multifrequency signaling receiver employing a dual-function detector-oscillator circuit which first operates to detect an off-hook condition and which, in response to such detection, is switched to form an oscillator circuit that generates a time-out warning tone.

These and other objects and features of the invention will be fully apprehended from the following detailed description of an illustrative embodiment of the invention and from the drawing in which.

Figure 2:
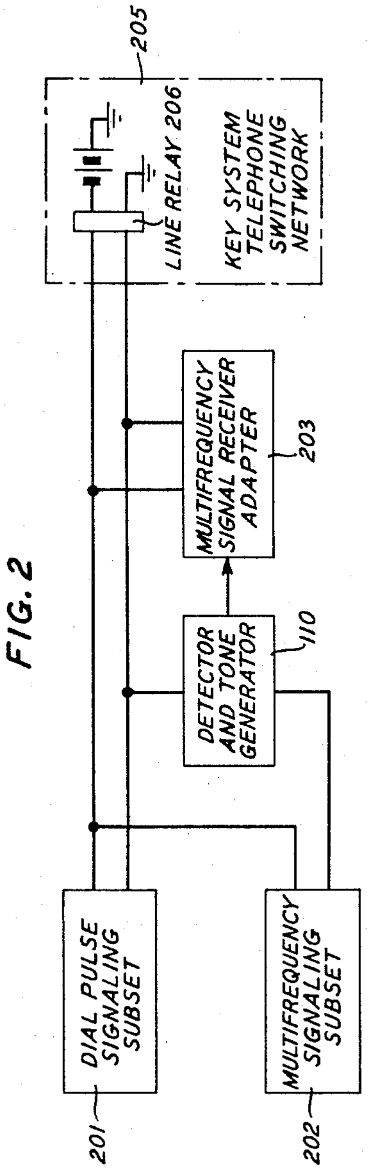
FIG. 2 is a block diagram of the individual subset connections in a telephone system employing a multifrequency signal receiver in accordance with the invention.

FIG. 2 illustrates the interconnection of both dial pulse signaling subsets and multifrequency signaling subsets in a key telephone system utilizing a multifrequency signal receiver adapter that includes a combination detector and tone generator in accordance with the invention. Each dial pulse signaling subset, such as set 201, is connected directly to the line relay 206 of a conventional key telephone switching network 205 by tip and ring leads T and R. A key telephone system switching network is disclosed in detail by H. T. Carter and S. A. Kelnhofer in United States Patent 2,883,457, issued Apr. 21, 1959. The tip lead T–TO of each multifrequency signaling station, such as station 202, and the ring lead R are bridged across the T and R leads serving the dial pulse sets. Each multifrequency signaling ring lead, however, is connected through the combination detector and tone generator circuit 110. If an off-hook condition at a multifrequency signaling subset is detected, multifrequency signal receiver adapter 203 is energized and detector 110 is converted to perform its tone generator function after a preselected delay period. The generated tone is pulsed and serves as a time-out warning signal. Multifrequency signal receiver adapter 203 includes the necessary multifrequency channel detector circuits and logic to convert each received multifrequency signaling signal into corresponding relay contact closures which are further utilized to effect through connections via switching network 205.

Figure 1:
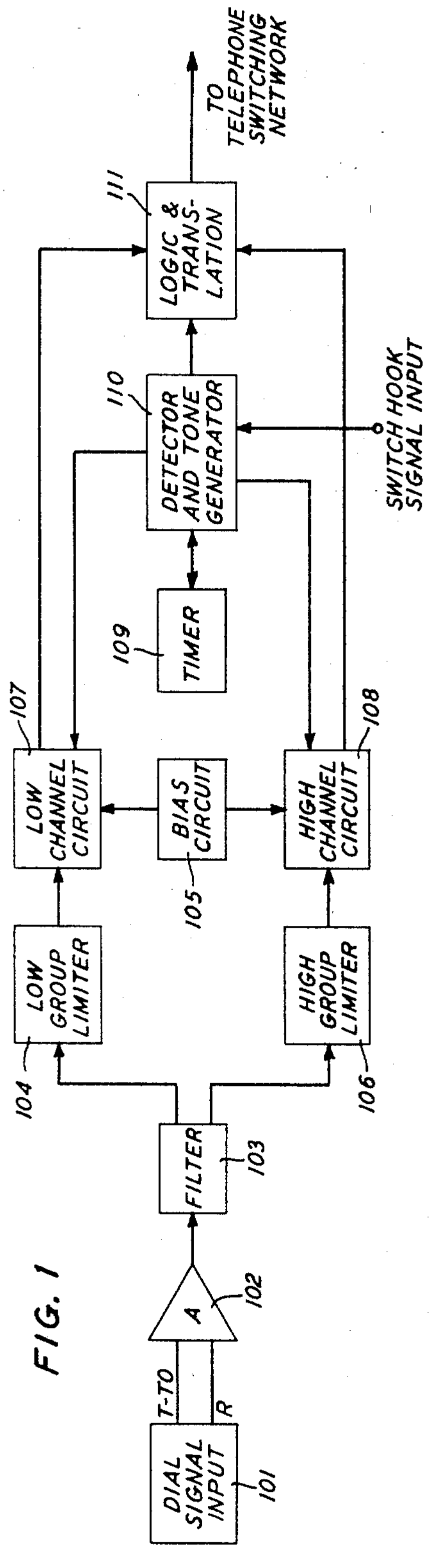
FIG. 1 is a block diagram of a multifrequency signal receiver in accordance with the invention.

A complete block diagram of a multifrequency signal receiver adapter in accordance with the invention is shown in FIG. 1. The interrelated functions of each of the units in the system may best be described by tracing the path of an input signal. Input signals in the form of multifrequency tone bursts are applied across leads T–TO and R to the input of amplifier 102. The output of amplifier 102 is separated into two frequency bands by the action of filter 103. Low frequency band signals are applied to group limiter 104, and high frequency band signals are applied to group limiter 106. The output of each of the limiters 104 and 106 is a square wave containing the fundamental and odd harmonics of the dominating frequency component of the signal. The output of limiter 104 is applied as an input to each of the individual channel detector circuits (not shown) in the low group channel circuits 107. Similarly, the output of limiter 106 is applied as an input to each of the individual channel detector circuits (not shown) in the high group channel circuit 108. A common bias supply 105 is used for each of the group channel circuits 107 and 108. The operation of any detector in the low group channel circuit 107 results in the operation of a single corresponding output device, such as a relay, for example, and similarly, the output of any detector in the high group channel circuit results in the operation of a single corresponding output device.

The coincident operation of a single output device in each of the channel circuits 107 and 108 is converted by a logic and translation circuit 111 from the 3 x 4 code to a 1-out-of-10 code, which may then be utilized in conventional fashion to operate an electromechanical switching network. Suitable filters, group limiters and translation circuits for a receiver of the general type shown in FIG. 1 are well known in the art, being shown, for example, by F. T. Boesch, D. H. Nash and L. Scheneke in United States Patent 3,128,349, issued Apr. 7, 1964.

Figure 3:
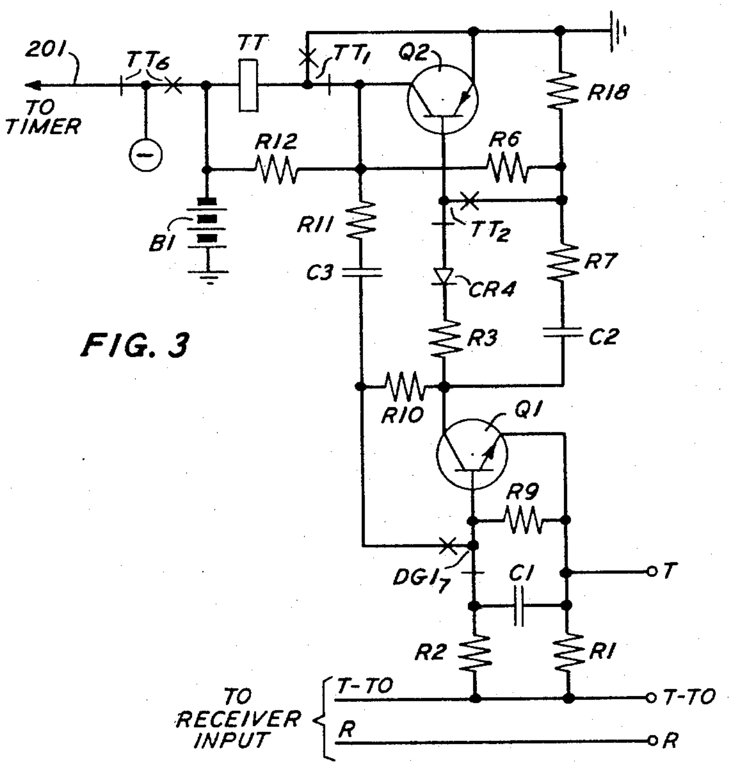
FIG. 3 is a schematic circuit diagram of the detector and tone generator shown in block form in FIG. 1.

The principal concept of the instant invention lies in the specific circuitry employed in the combination of timer 109 and detector-tone generator 110. Detailed circuitry for the combination detector-tone generator circuit 110 is shown in FIG. 3. As indicated above, this circuit provides two separate functions, line selection and alarm tone generation. A complete description of the circuit may best be presented in terms of the sequence of operations that is initiated by an off-hook condition on one of the multifrequency signaling subsets. Restriction of adapter seizure is provided by grouping all multifrequency signaling stations separately from dial pulse stations in the manner shown in FIG. 2. If an off-hook condition occurs at any multifrequency signaling station, line current is made to flow through resistor R1 which causes a slight voltage drop, on the order of .6 volt, for example. The voltage drop on resistor R1 is detected by transistor Q1 which turns on. The resulting output on the collector of transistor Q1 is applied to the base of transistor Q2 by way of resistor R3, diode CR4 and break contact $TT_2$ of relay TT. The signal so applied to the base of transistor Q2 permits this transistor to turn on, and collector current flowing through normally closed contact $TT_1$ operates relay TT. Relay TT locks up to ground over make contact $TT_1$, activates the receiver circuit by way of contacts (not shown) and disconnects itself from the line detector circuit by the operation of transfer contacts $TT_2$. The operation of transfer contacts $TT_1$, $TT_2$ and $TT_6$ alters the connecting paths between transistors Q1 and Q2 to the end that these transistors are then connected to form an astable multivibrator with timing provided by capacitor C2. Oscillation does not occur, however, until such time as enabling by the timer circuit of FIG. 4 takes place.

Figure 4:
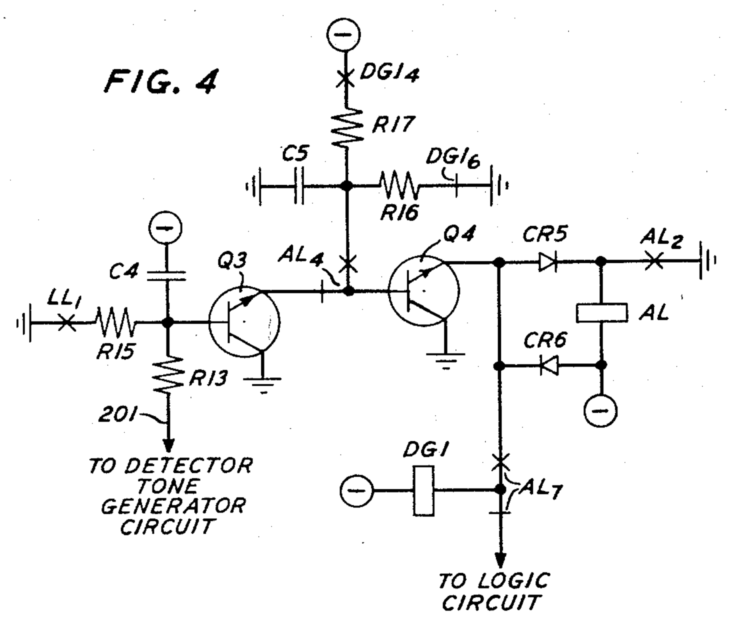
FIG. 4 is a schematic circuit diagram of the timer shown in block form in FIG. 1.

The time-out control feature is provided primarily by relay AL and its associated circuitry. Relay DG1 is utilized after the time-out period to interrupt alarm tone to the subscriber. This action occurs through the operation of transfer contacts $DG1_7$, FIG. 3. Operation of relay AL is controlled by transistors Q3 and Q4 which act as grounded collector switches. Capacitor C4, FIG. 4, is normally in a charged condition. When in an off-hook condition, a multifrequency signaling set is recognized in the manner described above in connection with the discussion of FIG. 3. The off-hook recognition is also utilized to operate relay LL in the logic and translation circuit 111, FIG. 1, over contacts (not shown) of relay TT. The closure of make contact $LL_1$, FIG. 4, provides a discharge path to ground for capacitor C4 by way of resistor R15. The path to battery B1, FIG. 3, has previously been opened by the operation of transfer contacts $TT_6$. A timing interval is established by the discharge of capacitor C4 through resistor R15. Resistor R13 provides a charging path for capacitor C4 during the idle condition of the unit.

After seizure, ground is applied to resistor R15 by contact $LL_1$, as previously noted. Relay LL remains operated until delay G1 is released on the start of the ringing condition. After this point, time-out cannot occur. The time constant of resistor R15 and capacitor C4 is selected so that relay AL operates approximately 10 seconds after the unit seizure if dialing has not then been completed.

When the relay AL operates, it locks up to ground over make contact $AL_2$ and is effectively disconnected from transistor Q4 by diode CR5. Operation of relay AL also disconnects off normal ground from the remainder of the circuit and releases any operated relays through the operation of contacts (not shown). Relay AL also transfers control of transistor Q4 to relay DG1 by way of resistors R16 and R17, and thus sets up a pulsing circuit consisting of resistors R16 and R17, capacitor C5, transistor Q4 and relay DG1. Transistor Q3 provides no further function. The pulser time constant may be selected to provide approximately equal on-off interruptions which may be at the rate of 5 pulses per second, for example. The interruption of alarm tone in the manner described is utilized to ensure easy subscriber recognition. The pulsed tone occurs as an output from the emitter of transistor Q1, on operation of make contact $DG1_7$, FIG. 3, and is applied across the R and T–TO leads by way of ground and the line relay 206, FIG. 2.

It is to be understood that the embodiment described herein is merely illustrative of the principles of the invention. Various modification thereto may be effected by persons skilled in the art without departing from the spirit or scope of the invention.

What is claimed is:

1. In a telephone system that includes both multifrequency and D-C signaling subsets, a multifrequency signal receiver comprising, in combination, first means for detecting multifrequency signals, dual purpose circuit means responsive to the off-hook condition of one of said multifrequency signaling subsets for enabling said first means and for generating a time-out warning tone, and circuit means for controlling the duration of said tone.

2. In a telephone system that includes both multifrequency and D-C signaling subsets, a multifrequency signal receiver comprising, in combination, first means for detecting multifrequency signals, and second circuit means responsive to the off-hook condition of one of said multifrequency signaling subsets for enabling said first means, said second circuit means including means operative a preselected period of time after the occurrence of said off-hook condition for converting said second circuit means into time-out, warning tone generating means.

3. In a telephone system that includes both multifrequency and D-C signaling subsets, a multifrequency signal receiver comprising, in combination, first means for converting multifrequency signals into corresponding D-C signals, second circuit means responsive to the off-hook condition of one of said multifrequency receivers, and insensitive to the off-hook condition of one of said D-C signaling subsets, for enabling said first means, said second circuit means including means operative a preselect period of time subsequent to the enabling of said first means for converting said second means into time-out, warning tone pulse generating means.

4. In a telephone system that includes both multifrequency and D-C signaling subsets, a multifrequency signal receiver comprising, in combination, first means for detecting multifrequency signals, second circuit means responsive to the off-hook condition of one of said multifrequency signaling subsets for enabling said first means, said second circuit means including means operative after said enabling of said first means for converting said second circuit into a warning tone signal generating circuit, and means operative a preselected period of time after the enabling of said first means for enabling said signal generating circuit.

5. Apparatus in accordance with claim 4 wherein said signal generating circuit enabling means includes a multicontact relay, certain of the contacts of said relay performing logic functions in said last named means and certain of said last named contacts being operated periodically to interrupt the operation of said generating circuit thereby to produce warning tone pulses.

6. In a telephone system that includes both multifrequency and D-C signaling subsets, a multifrequency signal adapter comprising, in combination, first and second transistors each including a base, an emitter and a collector electrode, a first normally open path including timing means connecting the collector of said first transistor to the base of said second transistor for applying a voltage change generated by the off-hook condition of one of said multifrequency signaling subsets to the base of said first transistor thereby turning said first transistor ON, a second normally closed circuit path for applying the collector output of said first transistor to the base of said second transistor thereby turning said second transistor ON, relay means responsive to the collector output of said second transistor for closing said first circuit path and for opening said second circuit path thereby forming a multivibrator circuit wherein the active elements thereof comprise said transistors, and means for energizing said multivibrator circuit a preselected period of time after the occurrence of said off-hook condition whereupon said multivibrator generates a time-out warning tone.

7. Apparatus in accordance with claim 6 wherein said energizing means includes a current source, means for storing current from said source and a normally closed conducting path between said source and said storing means.

8. Apparatus in accordance with claim 7 wherein said storing means comprises a capacitor that commences discharge upon the operation of said last named contacts, transistor switch means responsively operative to the discharge of said capacitor, and relay means responsively operative to the operation of said transistor means said last named relay means including contacts for interrupting the operation of said multivibrator circuit whereupon said time-out warning tone is generated as successive tone pulses.

9. In a telephone system that includes both multifrequency and D-C signaling subsets, means for translating multifrequency dial signals into D-C signals, dual function means responsive to the off-hook condition of one of said subsets for enabling said converting means and for generating a tone pulse time-out warning signal, and means operative a preselected period of time after said enabling for converting said dual function means from enabling means to generating means.

10. Apparatus in accordance with claim 9 wherein said dual function means comprises a first transistor and a second transistor and circuit paths interconnecting said first and second transistors and wherein said converting means comprises means for altering said circuit paths.

References Cited

UNITED STATES PATENTS 3,259,697 7/1966 Brumfield et al. ---- 179—84 XR

WILLIAM C. COOPER, *Primary Examiner.*

W. A. HELVESTINE, *Assistant Examiner.*

U.S. Cl. X.R.

179—16